Dec. 12, 1967  J. W. TAYLOR  3,358,227
ANALYZER SYSTEM USING PHASE DISTORTION MEASUREMENTS
Filed May 26, 1964
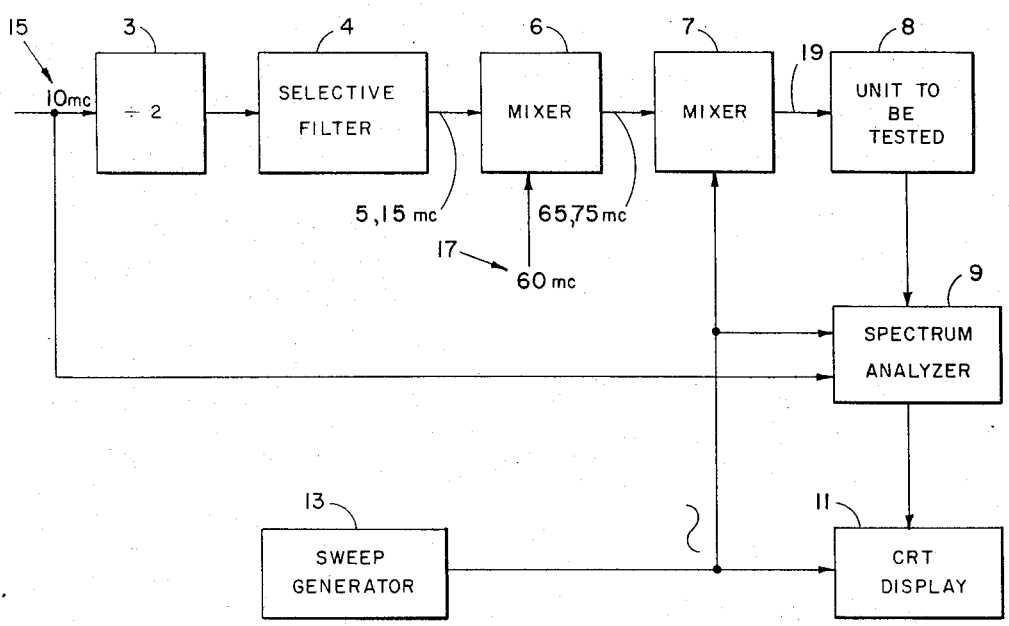
John W. Taylor,
*INVENTOR.*
BY Harry W. Saragovitz
Edward J. Kelly
Herbert Berl
Robert C. Sims

United States Patent Office 3,358,227
Patented Dec. 12, 1967

3,358,227
ANALYZER SYSTEM USING PHASE DISTORTION MEASUREMENTS
John W. Taylor, Baltimore, Md., assignor, by mesne assignments, to the United States of America as represented by the Secretary of the Army
Filed May 26, 1964, Ser. No. 370,389
1 Claim. (Cl. 324—57)

ABSTRACT OF THE DISCLOSURE

A system which analyzes electrical devices by generation and application to the device of a signal having two frequencies of fixed separation which are swept across a band of interest. The two frequencies at the output of the device to be tested are phase compared by a spectrum analyzer by measuring the phase of the different frequencies. The output at the phase comparison is integrated to produce the phase distortion characteristic of the device on a cathode ray tube.

---

There is a need to describe linear electrical circuit elements in terms of their effect upon the amplitude and phase of each frequency component of a signal which might be applied to it. Test equipment which analyzes the amplitude versus frequency characteristic is readily available, but phase measuring equipment of most of the prior art is limited to devices suitable only for point-by-point measurement. This is laborious and time consuming process.

A solution is to use a swept frequency input to provide a continuous display. The time delay inherent in any practical device causes its output to change phase over many radians as the input frequency is scanned over the band of interest. This causes difficulties in that the linear range of practical phase detectors is surpassed, and the linear phase versus frequency component (time delay) obscures the non-linear phase distortion term.

It is an object of this invention to provide a phase distortion analyzer which provides a continuous display.

Another further object of the present invention is to provide two input frequencies which are swept across a band of interest of the device to be tested.

A further object of the invention is to phase compare these two frequencies in the output of the device to be tested.

A still further object of this invention is to integrate the phase comparison to produce the phase distortion characteristic of the device.

The various features of novelty which characterize this invention are pointed out with particularity in the claims annexed to and forming a part of this specification. A better understanding of the advantages, specific objects obtained with use of, and many of the attendant advantages of this invention will be readily appreciated as the same becomes better understood by reference to the following detailed description when considered in connection with the accompanying drawing in which like reference numerals designate like parts throughout the figure thereof and wherein:

The single figure shows a block diagram illustrating a preferred form of the invention.

In order to better understand the operation of the system described in the figure, a description of its components referred to is first presented. Divider 3 is any conventional device which will produce a square wave output having one half of its input. A filter circuit is indicated at 4. Said filter circuit will select two components of its square wave input and provide a single output which has two frequencies. Mixers 6 and 7 are of the type which will mix each of the two frequencies with another frequency so as to have a single output with two different frequencies. Elements 3, 4, 6, and 7 combine to make up a dual frequency generator.

Block 8 indicates the device to be tested. This could be a wide band receiver, filter, mixer, etc. A spectrum analyzer 9 is of the type that will measure the relative phase (and compare said phases) of the two frequencies and display this vs. frequency on a cathode ray tube display 11. Spectrum analyzer 9 may be any conventional spectrum analyzer, such as those described in the U.S. patents to Tongue, Patent No. 2,661,419, and Feldman et al., Patent No. 3,182,254. A sweep generator 13 of conventional design is provided.

Operation

The operation of the invention occurs in the following manner. A 10 mc. signal 15 is divided by 2 in divider 3 to produce a square wave of 5 mc. frequency. A filter 4 selects 5 and 15 mc. components of this square wave. These components are then mixed by mixer 6 with a 60 mc. signal 17 to produce 65 and 75 mc. at the output. This output is in turn mixed by mixer 7 with a linearly swept frequency from sweep generator 13. The sweep of generator 13 is so chosen that when it is mixed with the output of 6 the signal output of mixer 7 will cover the band of frequencies of interest. Elements 3, 4, 6, and 7 along with signal inputs 13, 15 and 17 make up a dual frequency generator which will produce an output signal having two frequencies sweep across the band of interest while maintaining a fixed phase locked difference (in this specific case 10 mc.).

The output signal 19 of said dual frequency generator fed to a unit 8 which is to be tested. This signal passes through 8 and is distorted and time delayed thereby. The signal is then applied to a spectrum analyzer 9 which has phase measuring ability. The spectrum analyzer measures the relative phase of the two frequencies and displays relative phase vs. frequency. Since frequency and relative phase are a function of time, the phase may be integrated with respect to time to produce a display of absolute phase vs. frequency. The sweep frequency produced by sweep generator 13 is applied to both the CRT display 11 and to the spectrum analyzer 9. The sweep frequency is used as an LO signal by the spectrum analyzer. The 10 mc. signal 15 also serves as a reference for the spectrum analyzer.

The output of spectrum analyzer 9 is a voltage analog of phase difference obtained from phase measurement between the two signals. This may be displayed directly or an integrated display may be obtained. If the unit to be tested had a linear phase, the output would be a constant DC voltage. By subtracting this DC voltage from the actual output, a difference is gotten. If this difference is integrated and displayed vs. frequency, the result will be a plot of absolute phase variation from linear across the band of interest.

While in accordance with the provisions of the statutes, I have illustrated and described the best forms to the invention now know to me, it will be apparent to those skilled in the art that changes may be made in the form of the apparatus disclosed without departing from the spirit of the invention as set forth in the appended claim, and that in some cases certain features of the invention may sometimes be used to advantage without a corresponding use of other features. Accordingly, I desire the scope of my invention to be limited only by the appended claim.

I claim:
A phase distortion analyzer comprising a first constant frequency signal means connected to an input of a divider;

said divider having an output connected to an input of a selective filter which selects two components of its input and provides an output which has two frequencies; a second constant frequency signal means; a first mixer connected to said second signal means and the output of said filter for mixing said two frequencies with a second constant frequency of said second signal means; said mixer having an output which is connected to an input of a second mixer; a sweep generator connected to a second input of said second mixer; said second mixer mixing a swept frequency output of said sweep generator with the output of said first mixer whereby the two frequencies are swept linearly; the second mixer having an output which is connected to a linear electrical circuit element; a spectrum analyzer having an input connected to an output of said circuit element for measuring the relative phase of the two frequencies; said spectrum analyzer also having inputs connected to said first constant frequency signal means and said sweep generator; and a display means connected to an output of the spectrum analyzer.

References Cited

UNITED STATES PATENTS

| | | | |
|---|---|---|---|
| 2,931,217 | 4/1960 | Wendt et al. | 324—88 X |
| 3,074,014 | 1/1963 | Ross | 324—82 X |
| 3,182,254 | 5/1965 | Feldman et al. | 324—57 |

RUDOLPH V. ROLINEC, *Primary Examiner.*

E. E. KUBASIEWICZ, *Assistant Examiner.*